United States Patent
Mangold et al.

(10) Patent No.: US 8,888,373 B2
(45) Date of Patent: Nov. 18, 2014

(54) ROLLING BEARING CAGE AND ROLLING BEARING

(75) Inventors: Andreas Mangold, Sondheim (DE); Tobias Müller, Dipperz (DE); Andreas Bierlein, Hassfurt (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/882,843

(22) PCT Filed: Nov. 28, 2011

(86) PCT No.: PCT/EP2011/071141
§ 371 (c)(1),
(2), (4) Date: May 1, 2013

(87) PCT Pub. No.: WO2012/084411
PCT Pub. Date: Jun. 28, 2012

(65) Prior Publication Data
US 2013/0223780 A1 Aug. 29, 2013

(30) Foreign Application Priority Data
Dec. 23, 2010 (DE) .......................... 10 2010 056 059

(51) Int. Cl.
F16C 33/46 (2006.01)
F16C 33/56 (2006.01)
F16C 33/51 (2006.01)
F16C 33/66 (2006.01)
F16C 25/08 (2006.01)

(52) U.S. Cl.
CPC .................. *F16C 33/56* (2013.01); *F16C 33/46* (2013.01); *F16C 2208/10* (2013.01); *F16C 2360/31* (2013.01); *F16C 2300/14* (2013.01); *F16C 33/513* (2013.01); *F16C 33/664* (2013.01); *F16C 33/6637* (2013.01); *F16C 25/08* (2013.01)
USPC ............ 384/470; 384/576; 384/578; 384/623

(58) Field of Classification Search
CPC .......... F16C 33/46; F16C 33/51; F16C 33/56; F16C 33/502; F16C 33/513; F16C 33/3812; F16C 33/3825; F16C 33/6614; F16C 33/6651; F16C 260/31
USPC .......... 384/470, 523, 527, 576–578, 614, 623
See application file for complete search history.

(56) References Cited

U.S. PATENT DOCUMENTS 4,004,840 A * 1/1977 Johnston et al. ............... 384/526
5,082,375 A * 1/1992 Hillmann ...................... 384/526
(Continued)

FOREIGN PATENT DOCUMENTS

DE 3115780 11/1982
DE 3245332 A1 * 6/1984 ............. F16C 19/30
(Continued)

*Primary Examiner* — Marcus Charles
(74) *Attorney, Agent, or Firm* — Volpe and Koenig, P.C.

(57) ABSTRACT

A rolling bearing cage (10) having a plurality of loose segments (11, 12, 13, 14) arranged in the circumferential direction is provided. The segments (11, 12, 13, 14) comprise a main body (15) having at least one pocket (16) for receiving rolling bodies (21). At least one play compensating element (17) is arranged circumferentially between two adjacent main bodies (15), and the play compensating element (17) has circumferentially a higher elasticity than a main body (15), and the segments (11, 12, 13, 14) are arranged circumferentially without play at room temperature.

15 Claims, 4 Drawing Sheets

(56) References Cited

U.S. PATENT DOCUMENTS

| | | | |
|---|---|---|---|
| 5,165,805 A * | 11/1992 | Bauer et al. | 384/572 |
| 6,364,533 B1 * | 4/2002 | van der Knokke | 384/572 |
| 8,628,251 B2 * | 1/2014 | Kondou | 384/572 |
| 2008/0164124 A1 | 7/2008 | Reist et al. | |
| 2012/0063713 A1 * | 3/2012 | Beuerlein | 384/576 |

FOREIGN PATENT DOCUMENTS

| | | | | |
|---|---|---|---|---|
| DE | 3246348 A1 * | 6/1984 | | F16C 33/46 |
| DE | 3526627 A1 * | 2/1987 | | F16C 33/41 |
| DE | 10246825 | 4/2004 | | |
| DE | 102006022951 | 11/2007 | | |
| DE | 102009014779 | 9/2010 | | |
| DE | 102010021398 A1 * | 12/2011 | | F16C 33/46 |
| EP | 1408248 | 4/2004 | | |
| FR | 2535802 A1 * | 5/1984 | | F16C 33/38 |
| GB | 2233403 A * | 1/1991 | | F16C 33/50 |
| WO | WO 2008040290 A1 * | 4/2008 | | |
| WO | WO 2010102603 A3 * | 11/2010 | | |

* cited by examiner

ROLLING BEARING CAGE AND ROLLING BEARING

CROSS-REFERENCE TO RELATED APPLICATION

This application claims the benefit of German Patent Application No. 102010056059.6, filed Dec. 23, 2010 and PCT Application No. PCT/EP2011/071141, filed Nov. 28, 2011.

FIELD OF THE INVENTION

The invention relates to a rolling bearing cage with several loose segments arranged in the circumferential direction, wherein the segments have a base body with at least one pocket for holding rolling bodies. The invention also relates to a rolling bearing comprising such a rolling bearing cage.

Such rolling bearing cages are suitable, in particular, for use in so-called large-diameter rolling bearings. Large-diameter rolling bearings are used, e.g., in rotor bearings of wind turbines or in main bearings of tunnel boring machines and have a reference circle diameter of greater than 600 mm, e.g., greater than 1000 mm or greater than 1500 mm.

Conventional rolling bearing cages consisting of two side plates and a plurality of crossing members connecting the side plates can also be used for large-diameter rolling bearings. Both the production and also the installation of such rolling bearing cages, however, present problems that grow with increasing reference circle diameter. However, the production, transport, and installation of the segments holding one or more rolling bodies is relatively simple and economical.

From DE 102 46 825 A1, a rolling bearing cage is known with several loose, i.e., not mechanically interconnected, segments made from plastic and arranged in the circumferential direction, wherein the segments have a base body with at least one pocket for holding rolling bodies. To prevent circumferential warping of the segments due to greater expansion of the plastic segments relative to the metallic bearing rings, a final play in the form of a gap must be provided between the segments according to DE 102 48 825 A1, wherein the gap is at least 0.15% of a circle running centrally through the segments arranged in a line. Excessive impact of the end sides of adjacent segments during operation should be prevented according to DE 102 46 825 A1 such that the gap is, at a maximum, 1% of the circle running centrally through the segments arranged in a line. In the solution of DE 102 46 825 A1 it is disadvantageous that impact is basically unavoidable due to the gap required by the different materials of the segments and the bearing ring and the segments are distributed in a non-uniform and uncontrollable manner over the circumference during operation.

From DE 10 2006 022 951 A1, a rolling bearing cage of a rotor main bearing is known that consists of a plurality of segments arranged circumferentially. Each segment of DE 10 2006 022 951 A1 can hold several rolling bodies and is connected on the end side with an element that is circumferentially adjacent by means of a coupling unit receiving tensile forces, i.e., there can be no loose segments. The segments of the rolling bearing cage of DE 10 2006 022 951 A1 have a circumferential end play, i.e., the individual segments can shift freely in the circumferential direction according to the end play, which can compensate for different magnitudes of thermal expansions that are caused by temperature differences and occur in the segments on one side and in the bearing rings on the other side. The coupling units of DE 10 2006 022 951 A1 should here guarantee that the play is distributed uniformly in the circumferential direction, so that the segments are ultimately arranged essentially uniformly over the circumference. It is disadvantageous here that the coupling units of DE 10 2006 022 951 A1 that receive tensile forces, especially for a vertical installation in a large-diameter rolling bearing, can be greatly loaded by the large weights of the rolling bodies. It is also disadvantageous in such an application of the rolling bearing cage of DE 10 2006 022 951 A1 that, during operation, a segment leaving a load zone can impact an adjacent segment depending on gravity, which can lead, on one hand, to disruptive noises and, on the other hand, to possible damage to the segments.

From DE 10 2009 014 779 A1, a rolling bearing cage is also known whose segments have a play circumferentially in order to be able to compensate for temperature fluctuations and wherein every two adjacent segments are connected to each other by a coupling unit receiving tensile forces. According to DE 10 2009 014 779 A1, it is provided that the play between two adjacent segments is loaded by spring force, especially by means of a leaf spring or plate spring. In the solution of DE 10 2009 014 779 A1 it is disadvantageous that a more complex and complicated construction results due to the use of metallic spring elements in combination with the coupling units that receive tensile forces and connect the segments mechanically and the impact of the individual segments with each other cannot be completely ruled out.

SUMMARY

The present invention is based on the objective of disclosing a rolling bearing cage according to the class that allows, in particular, for a vertical application in a large-diameter rolling bearing, a uniform spacing of the segments, prevents an impact of individual segments, has a long service life, and can be produced easily and economically.

This objective is met by a rolling bearing cage according to the independent claim. Consequently a rolling bearing cage according to the class is characterized in that at least one play compensating element is arranged circumferentially between two adjacent base bodies and the play compensating element has a higher elasticity in the circumferential direction than a base body and the segments are arranged without play in the circumferential direction at room temperature.

The present invention goes along a completely different path than, e.g., DE 10 2006 022 951 A1 or DE 10 2009 014 779 A1 for overcoming the disadvantages resulting from DE 102 46 825 A1.

Instead of providing the play between segments, which is considered necessary in the prior art, and attempting to provide this play through mechanical coupling units distributed uniformly over the circumference, the segments of the rolling bearing cage according to the invention are not spaced apart from each other by play in the circumferential direction. Instead, a play-free or gap-free arrangement of the segments relative to each other is provided at room temperature, i.e., at 20 degrees Celsius. The segments thus cannot move freely in the circumferential direction without compressing the play compensating element, in particular, they cannot move without applying forces. An impact of adjacent segments is therefore ruled out.

Different thermal expansions of the segments relative to the bearing rings due to different materials of the segments and bearing rings are thus also not compensated by means of a play between the segments. Instead, the play compensating element can absorb expansions of the segments caused by heating or also by swelling effects. A play compensating element in the scope of the invention is thus an element that has elasticity through which the play compensating element can completely absorb the mentioned expansions of a segment in any possible operating point. For this purpose, the play compensating element has a higher elasticity in the circumferential direction than the base body. This higher elasticity of the play compensating element can be achieved through the selection of a certain material and/or through the structural design of the play compensating element. Here, elasticity is understood to be the property of an elastic deformation in the circumferential direction under the effect of a circumferential compressive force. Because the play compensating element has a higher elasticity, if the segments expand in the circumferential direction, this element is compressed predominantly or exclusively in comparison with the base bodies. The expansion of the segments thus can be absorbed within the rolling bearing cage, without resulting in an impermissible warping or deformation of the base bodies.

Even at room temperature a play-free arrangement of the segments is provided. That is, even at this time, the segments cannot move freely in the circumferential direction, but instead have a controlled circumferential position. The rolling bodies that are held or can be held in the segments are thus distributed uniformly, so that improved kinematics of a corresponding rolling bearing are possible.

Consequently it is possible according to the invention to completely eliminate mechanical connections of the segments, e.g., the coupling units known from DE 10 2006 022 951 A1 or DE 10 2009 014 779 A1. The segments of the rolling bearing cage according to the invention are thus arranged loose in the circumferential direction, i.e., the segments are not connected to each other by a coupling unit receiving tensile forces. The rolling bearing cage according to the invention can thus be produced easily and economically, the service life is increased, and the installation can be significantly simpler.

Embodiments of the present invention are disclosed in the dependent claims.

According to one embodiment, it is provided that the play compensating element causes a circumferential biasing stress of the segments at room temperature. The play compensating element thus exerts a circumferential compressive force on adjacent segments even at room temperature.

For the rolling bearing cage to be able to absorb expansions of the segments relative to the bearing rings, a decisive feature is that the play compensating element or elements have a higher elasticity than the base bodies. This can be realized, on one side, by the selection of the materials of the rolling bearing cage. Thus it is provided that, according to one embodiment, the play compensating element consists of a different material than the base bodies. The play compensating element can consist, in particular, from a material with a lower modulus of elasticity (Young's Modulus) than a base body. Typically, the base bodies are made from a plastic, in particular, the base bodies can be made from fiber-reinforced plastic and/or PEEK. A fiber-reinforced plastic can be reinforced by glass fiber and/or carbon fiber. The play compensating element can also be made from plastic, in particular, the play compensating element can be made from rubber such as, e.g., HNBR or NBR. NBR is a nitrile rubber and HNBR is a hydrogenated acryl nitrile butadiene rubber that is distinguished by high temperature stability. It is also conceivable that the play compensating element is formed by a gel pad or by a material with hyper-elastic properties or a foam-like material.

The circumferentially higher elasticity of the play compensating element relative to the base body can be achieved alternatively or additionally through the structural design of the play compensating element. Thus, the play compensating element can have, e.g., a honeycomb-like structure with (air) inclusions or can form projections that reduce the contact surface area.

According to one embodiment it is provided that at least one play compensating element is arranged between two circumferentially adjacent base bodies. Except for the base bodies between which the play compensating element or elements act or are arranged, the base bodies thus contact each other even at room temperature. In this embodiment it is conceivable that a single or multiple play compensating elements, e.g., acting in parallel, are arranged between the two adjacent segments.

Alternatively it is possible that at least one play compensating element is arranged between multiple base bodies, in particular, all of the base bodies. If fewer play compensating elements are used than segments, then the play compensating elements can be arranged distributed equidistant in the circumferential direction.

It is possible that the play compensating element is formed by a separate element from the base bodies. This is a separate component that can be inserted between two base bodies in the circumferential direction. Thus it is provided according to one embodiment that the at least one play compensating element has a spherical shape and engages in a spherical section-shaped recess of the two adjacent base bodies. Obviously, other types of play compensating element shapes can also be provided, e.g., rectangular blocks.

Alternatively, it is possible that the play compensating element is connected to a base body with a positive fit, non-positive fit, material fit, or combinations of these different fits. It is conceivable to connect, e.g., the play compensating element with a positive fit by snapping a hook into a drilled hole, an undercut section, or the like in a base body. With a base body made from plastic (e.g., PEEK) by injection molding, it is possible to inject mold the play compensating element directly on the base body in the same production step. It is also possible to adhere the play compensating element, e.g., on an end face of a base body or, if base bodies and play compensating elements are made from plastic, to weld them thermally. Thus it is especially conceivable that the play compensating element cannot be separated from the base body in a non-destructive manner. This further simplifies the installation of the rolling bearing cage. One, multiple, or all of the segments thus comprise a base body and at least one play compensating element, wherein the segments can be formed integrally or in one piece by the base body and play compensating element. In particular, it can be provided that each segment has, on a circumferential end region or on two circumferential end regions, a play compensation element formed with the base body. All of the segments thus have an identical form and have integrally formed play compensation elements. Here, the play compensation element can form an essentially flat, circumferential end face of the segment. Here, advantageously a large surface area contact between two adjacent segments is made possible: either by means of the contact of the play compensating element of one segment to the base body of an adjacent segment or by means of the contact of the play compensating element of one segment and the play compensating element of an adjacent segment.

According to another embodiment it is provided that the at least one play compensating element forms a lubricant reservoir. This can be realized, e.g., through the structural formation of the play compensating element. Thus it is possible to provide the play compensating element with openings, drilled holes, grooves, recesses, etc., which hold lubricant and can discharge to raceways of the bearing rings. Alternatively or additionally, a holding of lubricant can also be promoted by the selection of the material of the play compensating element. For example, the play compensating element can comprise a sponge-like material that is suitable for storing lubricant.

In principle it is also possible to integrate a sensor in a play compensating element. A conceivable sensor here is, in particular, a force sensor (accelerometer), a temperature sensor, or a lubricant sensor. Thus, a force sensor can directly detect the compressive forces prevailing between two adjacent segments during operation.

The rolling bearing cage according to the invention is suitable, in particular, as a rolling bearing cage of a large-diameter rolling bearing, because here the advantages of the play-free arrangement of the segments have a significant effect along with the simultaneous possibility of the expansion of the segments. For example, a rolling bearing with a rolling bearing cage according to the invention can be formed as a rotor bearing in a wind turbine.

BRIEF DESCRIPTION OF THE DRAWINGS

Embodiments of the present invention are explained below with reference to the accompanying figures. Shown here are

DETAILED DESCRIPTION OF THE PREFERRED EMBODIMENTS

Elements that are identical or functionally identical are marked with the same reference symbols.

Figure 1:
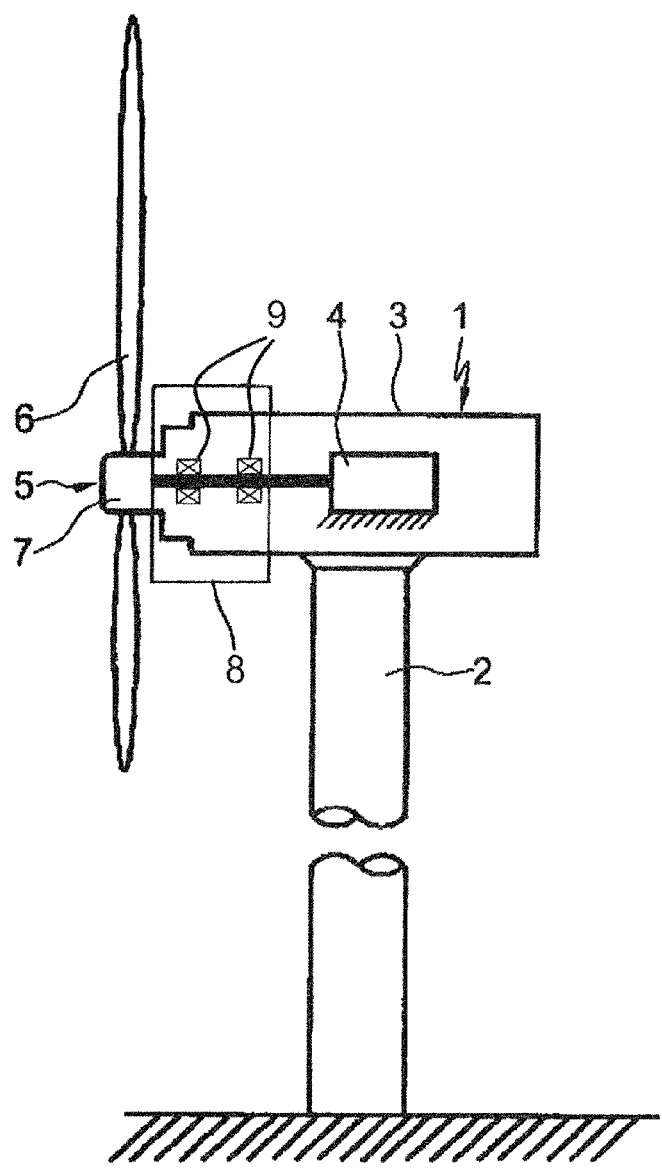
FIG. 1 shows a wind turbine comprising a rolling bearing according to the invention.

FIG. 1 shows a wind turbine 1 comprising a rotor supported by means of two rolling bearings according to the invention. The wind turbine 1 comprises a machine tower 2 on which a machine house 3 is arranged with a generator 4 and also a wind-driven rotor 5 with a rotor hub 7 carrying several rotor blades 6. The rotor 5 is supported by a rotor bearing 8. The rotor bearing 8 comprises two rolling bearings 9 according to the invention, e.g., two tapered roller bearings in an O arrangement.

Figure 2:
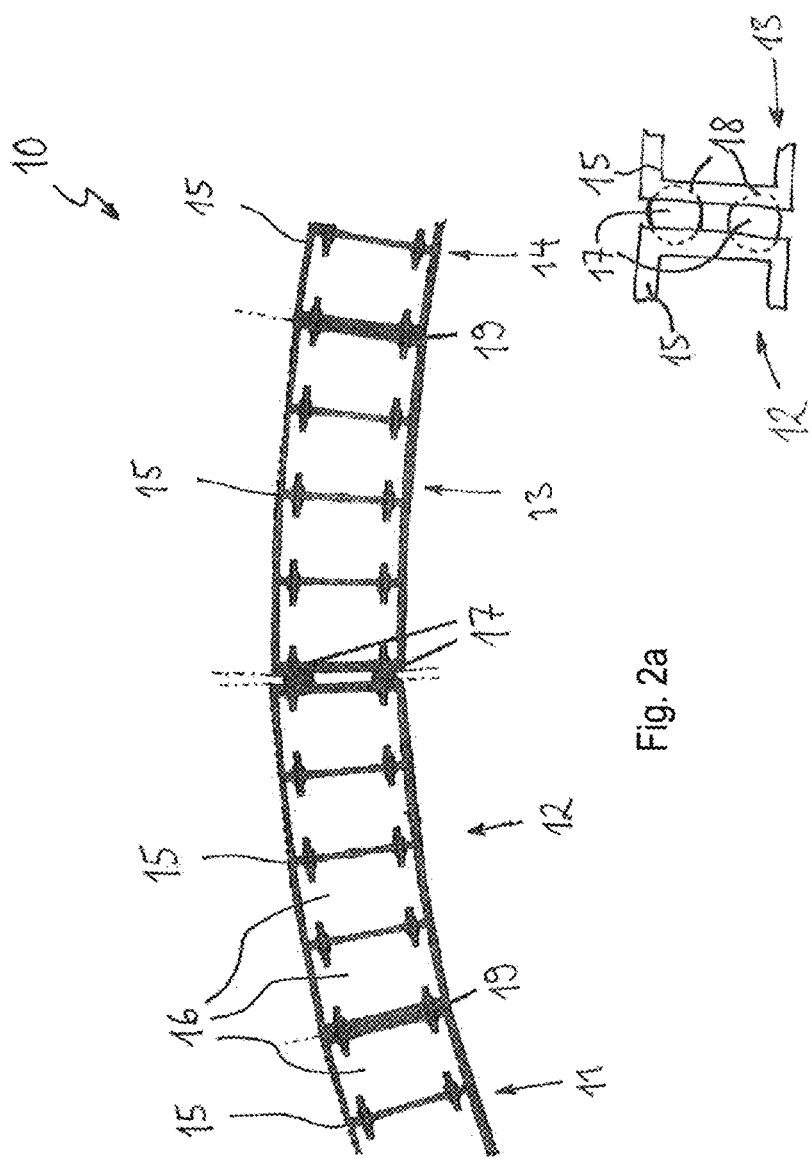
FIG. 2a shows a first embodiment of a rolling bearing cage according to the invention.
FIG. 2b shows a magnified view of the first embodiment of a rolling bearing cage according to the invention shown in FIG. 2a, FIG. 3a shows a second embodiment of a rolling bearing cage according to the invention.

FIGS. 2a and 2b show a first embodiment of a rolling bearing cage 10 according to the invention. This is shown as a rolling bearing cage 10 of a tapered roller bearing and is shown in section in a schematic top view.

The rolling bearing cage 10 comprises several segments arranged loosely in the circumferential direction, wherein four segments 11, 12, 13, 14 (partial) are shown. Each segment 11, 12, 13, 14 has a base body 15 made from PEEK. Each base body 15 has four pockets 16 for holding tapered, not shown rolling bodies.

The rolling bearing cage 10 comprises two play compensating elements 17 that are arranged circumferentially between two adjacent base bodies 15, namely the base bodies 15 of the segments 12 and 13. Between the other base bodies there are no play compensating elements. All of the segments are arranged without play at room temperature, i.e., that cannot move without applying force in the circumferential direction. In particular, they touch the other segments at contacts 19 without play.

The play compensating elements 17 are formed by two balls that are made from a material that has a lower modulus of elasticity than the material of the base body 15. Thus, the play compensating elements 17 have circumferentially a higher elasticity than the base bodies. In the event of a temperature increase in a rolling bearing with this rolling bearing cage, the base bodies and thus the segments can expand circumferentially because the play compensating elements 17 are compressed.

The play compensating elements 17 are each held in spherical section-shaped recesses 18 of the base body 15 and form separate components from the base bodies 15—as can be seen in the detailed view.

Figure 3:
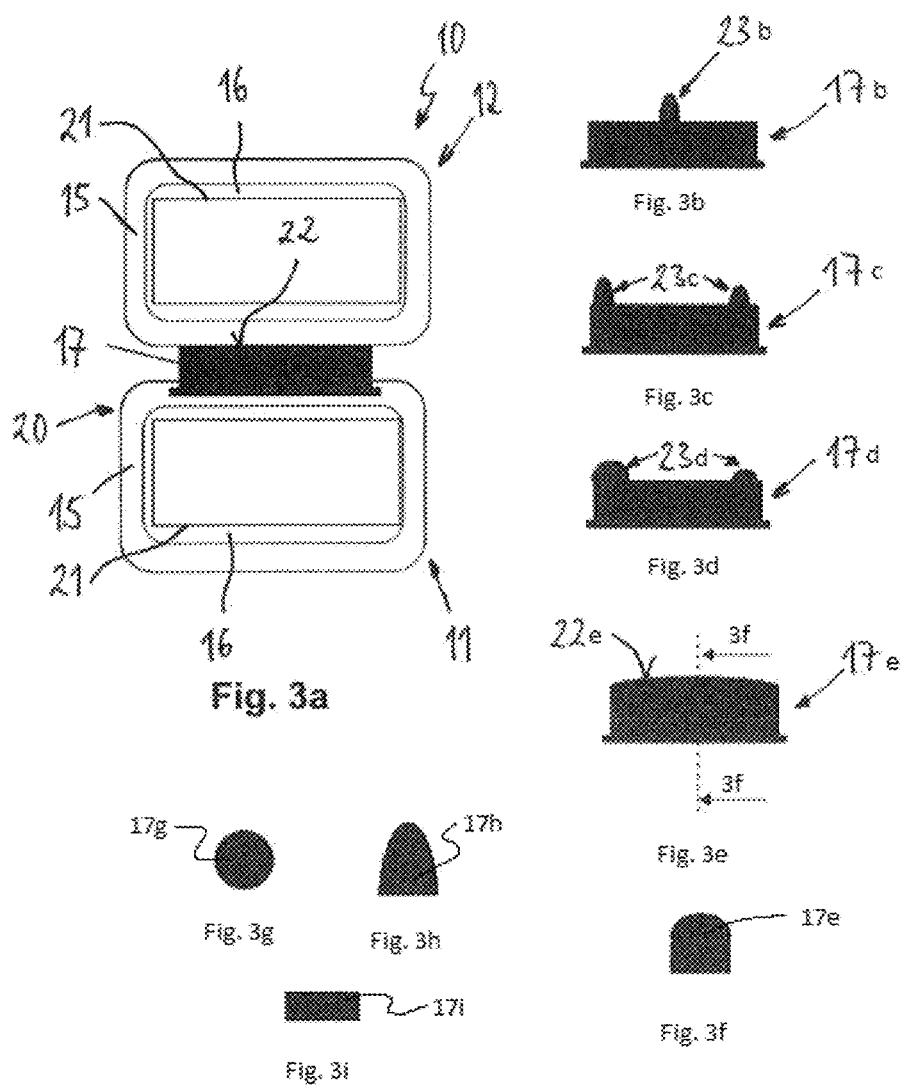
FIG. 3b shows a first alternative embodiment of the play compensating element of FIG. 3a, FIG. 3c shows a second alternative embodiment of the play compensating element of FIG. 3a, FIG. 3d shows a third alternative embodiment of the play compensating element of FIG. 3a, FIG. 3e shows a fourth alternative embodiment of the play compensating element of FIG. 3a, FIG. 3f shows a first alternative profile of a play compensating element.
FIG. 3g shows a second alternative profile of a play compensating element.
FIG. 3h shows a third alternative profile of a play compensating element.
FIG. 3i shows a fourth alternative profile of a play compensating element.

FIG. 3a shows a second embodiment of a rolling bearing cage 10 according to the invention, wherein two segments 11, 12 are shown. Each segment 11, 12 comprises a base body 15 that forms a single pocket 16 for holding a cylindrical rolling body 21.

A single play compensating element 17 that is connected to a base body 15 with a positive fit is located circumferentially between the two shown segments 11, 12. The corresponding segment 11 is thus made from a base body 15 and a play compensating element 17.

The play compensating element 17 is arranged on an end area 20 of the segment 11 and forms a circumferential end face 22 of the segment 11.

In FIGS. 3b-3e, variations of a play compensating element 17 that can be inserted into the segment 11 are shown. These play compensating elements 17 differ through the shape of the contact areas with which they come in contact with the adjacent segment 12. The play compensating elements 17 have, e.g., one or two projections 23, wherein, in the latter case, the two projections 23 can have identical or different constructions. FIG. 3b shows a play compensating element 17b with one projection 23b. FIG. 3c shows a play compensating element 17c with two projections 23c with different sizes. FIG. 3d shows a play compensating element 17d with two projections 23d with different sizes. FIG. 3e shows a play compensating element 17e with a circumferential end face 22e with a slightly convex profile.

In Figs. 3f-3i, possible profiles of the play compensating element 17 are shown. FIG. 3f shows a profile of play compensating element 17e along line 3f-3f from FIG. 3e. FIGS. 3g-3i show alternative profiles of play compensating elements 17g, 17h, and 17i, respectively.

Figure 4:
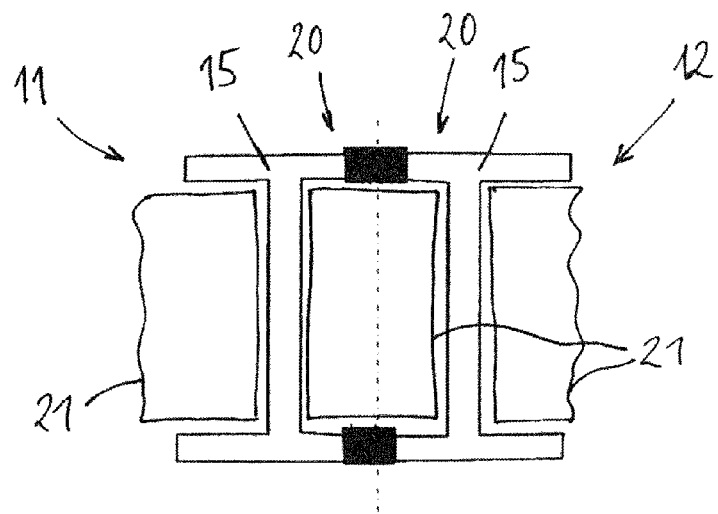
FIG. 4 shows a third embodiment of a rolling bearing cage according to the invention.

FIG. 4 shows a third embodiment of a rolling bearing cage 10 according to the invention, wherein a section of two adjacent segments 11, 12 is shown. Play compensating elements 17 are formed, e.g., adhered to peg-shaped projections on end areas 20 of the segments 11, 12.

Figure 5:
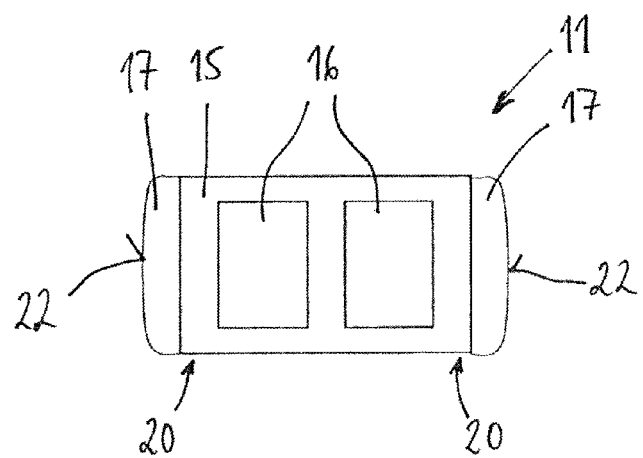
FIG. 5 shows a fourth embodiment of a rolling bearing cage according to the invention.

In FIG. 5, a segment 11 according to a fourth embodiment of a rolling bearing cage 10 according to the invention is shown. A corresponding rolling bearing cage 10 comprises a plurality of such identical segments 11. Each segment 11 has a play compensating element 17 on two circumferential, opposing end areas 20. The play compensating element 17 is produced through injection molding like the base body 15 and was produced with the base body 15 or molded onto the base body in the same production step. Such a segment 11 thus consists of a base body 15 and two play compensating elements 17, wherein the segment 11 cannot be separated in a non-destructive manner into base bodies 15 and play compensating elements 17.

List of Reference Numbers
1 Wind turbine
2 Machine tower
3 Machine house
4 Generator
5 Rotor
6 Rotor blade
7 Rotor hub
8 Rotor bearing
9 Rolling bearing
10 Rolling bearing cage
11 Segment
12 Segment
13 Segment
14 Segment
15 Base body
16 Pocket
17 Play compensating element
18 Spherical section-shaped recess
19 Contact
20 End region
21 Rolling body
22 End side
23 Projection (of the play compensating element)

The invention claimed is:

1. Rolling bearing cage comprising several loose segments arranged in a circumferential direction, each of the segments includes a base body with at least one pocket for holding rolling bodies, at least one play compensating element is arranged circumferentially between two adjacent ones of the base bodies, the at least one play compensating element is compressible between end faces of the two adjacent ones of the base bodies, and the play compensating element has a higher elasticity in the circumferential direction than the base body and the segments are arranged circumferentially without play at room temperature.

2. Rolling bearing cage according to claim 1, wherein the play compensating element causes a circumferential biasing of the segments at room temperature.

3. Rolling bearing cage according to claim 1, wherein the play compensating element is formed of a different material than the base body.

4. Rolling bearing cage according to claim 1, wherein the base bodies are made from a plastic and the play compensating element is made from plastic.

5. Rolling bearing cage according to claim 4, wherein the base bodies are made from at least one of fiber-reinforced plastic or PEEK.

6. Rolling bearing cage according to claim 4, wherein the play compensating element is made from HNBR or NBR.

7. Rolling bearing cage according to claim 1, wherein at least one of the play compensating element is arranged between two circumferentially adjacent ones of the base bodies.

8. Rolling bearing cage according to claim 1, wherein at least one of the play compensating elements is arranged between multiple ones of the base bodies.

9. Rolling bearing cage according to claim 1, wherein the play compensating element is formed by a separate element from the base bodies.

10. Rolling bearing cage according to claim 9, wherein the at least one play compensating element has a spherical shape and engages in a spherical section-shaped recess of the two adjacent ones of the base bodies.

11. Rolling bearing cage according to claim 1, wherein the play compensating element is connected to one of the base bodies with a positive fit, non-positive fit, material fit, or combinations of the different fits.

12. Rolling bearing cage according to claim 11, wherein the play compensating element cannot be separated from the base body in a non-destructive way.

13. Rolling bearing cage according to claim 11, wherein each segment on a circumferential end area or on two circumferential end areas has one of the play compensating elements formed integrally with the base body.

14. Rolling bearing cage according to claim 1, wherein the play compensating element forms an essentially flat, circumferential end face of the segment.

15. Rolling bearing comprising a rolling bearing cage according to claim 1.

* * * * *